(12) United States Patent
Murakami

(10) Patent No.: US 8,454,039 B2
(45) Date of Patent: Jun. 4, 2013

(54) VEHICLE STEERING SYSTEM

(75) Inventor: Tetsuya Murakami, Shiki-gun (JP)

(73) Assignee: JTEKT Corporation, Osaka-shi (JP)

( * ) Notice: Subject to any disclaimer, the term of this patent is extended or adjusted under 35 U.S.C. 154(b) by 29 days.

(21) Appl. No.: 13/182,093

(22) Filed: Jul. 13, 2011

(65) Prior Publication Data

US 2012/0018991 A1   Jan. 26, 2012

(30) Foreign Application Priority Data

Jul. 20, 2010   (JP) .................................. 2010-162983

(51) Int. Cl.
*B62D 3/12*   (2006.01)

(52) U.S. Cl.
USPC ................. 280/93.515; 280/93.514; 180/400

(58) Field of Classification Search
USPC ....................................... 280/93.514, 93.515
See application file for complete search history.

(56) References Cited

U.S. PATENT DOCUMENTS 8,201,656 B2 * 6/2012 Archer et al. ................. 180/428
2004/0201194 A1 10/2004 Zhang et al.
2007/0035117 A1 2/2007 Green
2007/0164852 A1 * 7/2007 Litkouhi ....................... 340/435
2007/0288152 A1 * 12/2007 Lu et al. .......................... 701/70

FOREIGN PATENT DOCUMENTS

| DE | 100 03 936 A1 | 8/2001 |
| JP | A-2006-137204 | 6/2006 |
| WO | WO 2004/058558 A1 | 7/2004 |

OTHER PUBLICATIONS

Nov. 29, 2011 Extended European Search Report issued in European Patent Application No. 11174314.2.

* cited by examiner

*Primary Examiner* — Joseph Rocca
*Assistant Examiner* — Barry Gooden, Jr.
(74) *Attorney, Agent, or Firm* — Oliff & Berridge, PLC

(57) ABSTRACT

A vehicle steering system includes: a steering member; steered wheels; a steered shaft; a housing; a fitting bracket that has a first bolt insertion hole; a vehicle body-side member that has a second bolt insertion hole; and a bolt that is inserted through the first bolt insertion hole and the second bolt insertion hole. One of the first bolt insertion hole and the second bolt insertion hole is a long hole. When a reverse input equal to or larger than a predetermined value is applied from a road surface to the steered wheel, the bolt is displaced within the long hole in the lateral direction, causing the fitting bracket to displace with respect to the vehicle body-side member in the lateral direction.

2 Claims, 6 Drawing Sheets

F I G . 1
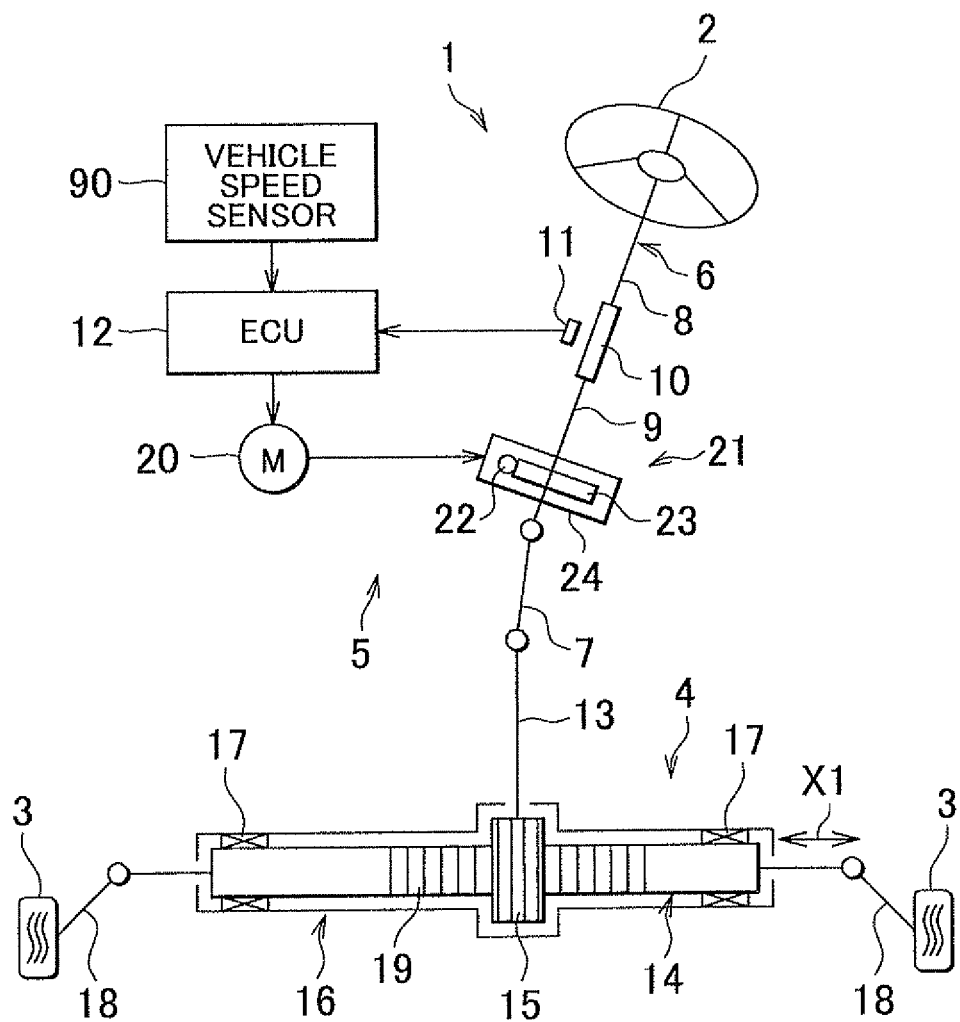

VEHICLE STEERING SYSTEM

INCORPORATION BY REFERENCE

The disclosure of Japanese Patent Application No. 2010-162983 filed on Jul. 20, 2010 including the specification, drawings and abstract is incorporated herein by reference in its entirety.

BACKGROUND OF THE INVENTION

1. Field of the Invention

The invention relates to a vehicle steering system.

2. Description of Related Art

There has been suggested a steering rack fitting structure as described in, for example, Japanese Patent Application Publication No. 2006-137204 (JP 2006-137204 A). With this steering rack fitting structure, when a vehicle collides with an obstacle ahead and an engine moves toward the rear of the vehicle, a steering rack is moved toward the rear of the vehicle to absorb collision energy. Recently, in many steering gears of rack-and-pinion type, a steering gear is rigidly fitted to a vehicle body to improve steering feel.

SUMMARY OF THE INVENTION

There is a problem that, when a steered wheel drives over, for example, a curb and an abrupt reverse input from a road surface is applied to the steered wheel, abnormal noise due to contact between a rack shaft and a rack stopper is generated. There is also a problem that when an abrupt reverse input is applied to the steered wheel, the rack stopper breaks, teeth of a pinion that meshes with a rack breaks, or, for example, universal joints at both ends of an intermediate shaft break.

Especially, in a column-type electric power steering system where an output from an electric motor is applied to a steering shaft, components having high rotary inertia such as a steering member (steering wheel), an electric motor and a speed reduction mechanism are arranged near a steering column. Therefore, if an abrupt reverse input is applied while these components are rotating, these components are likely to break. The invention provides a vehicle steering system with which, in an emergency situation where an abrupt reverse input is applied to a steered wheel, a user is notified of occurrence of an abnormality while breakage of a main portion is prevented.

An aspect of the invention relates to a vehicle steering system, including a steering member, steered wheels, a steered shaft, a housing, a fitting bracket, a vehicle body-side member, and a bolt. The steered shaft moves in an axial direction that extends along a lateral direction of a vehicle in response to an operation of the steering member to thereby steer the steered wheels. The housing supports the steered shaft such that the steered shaft is movable in the axial direction. The fitting bracket is formed on the housing, and has a first bolt insertion hole. The vehicle body-side member has a second bolt insertion hole. The bolt is inserted through the first bolt insertion hole and the second bolt insertion hole to fasten the fitting bracket to the vehicle body-side member. One of the first bolt insertion hole and the second bolt insertion hole is a long hole that extends in the lateral direction. In an emergency situation where a reverse input equal to or larger than a predetermined value is applied from a road surface to the steered wheel, the bolt is displaced within the long hole in the lateral direction, causing the fitting bracket to displace with respect to the vehicle body-side member in the lateral direction.

In the vehicle steering system according to the aspect of the invention, when the steered wheel strongly collides with, for example, a curb and a relatively large reverse input is applied to the steered wheel, the bolt moves, along the lateral direction of the vehicle, within the long hole. Thus, it is possible to displace the fitting brackets with respect to the vehicle body-side member in the lateral direction of the vehicle. Therefore, it is possible to achieve the state where only a positional relation of the steering member with respect to the steered wheels deviates from a normal positional relation. As a result, it is possible to notify a driver of occurrence of an abnormality. The driver who has recognized the occurrence of the abnormality is urged to drive the vehicle to, for example, an auto-repair garage.

Also, in a steering path extending from the steering member to the steered wheels, the portion, which is relatively close to the steered wheels, is displaced with respect to the vehicle body-side member so that an impact is absorbed. Thus, most of the components arranged at the upstream side portion of the steering path are not affected. Especially, when a column-type electric power steering system is employed as the vehicle steering system, components having high rotary inertia such as the steering member (steering wheel), an electric motor and a speed reduction mechanism are arranged near a steering column. However, an impact force is not applied to these components. Therefore, it is possible to protect a main portion of the vehicle steering system against the above-described relatively large reverse input.

In the vehicle steering system according to the aspect described above, the long hole may have a center portion in which the bolt is fitted in a normal situation, and paired emergency position keeping portions that are formed on respective sides of the center portion and used to keep a position of the bolt that has been displaced in the emergency situation. In this case, the position of the bolt displaced with respect to the center portion in an emergency situation is kept by one of the emergency position keeping portions of the long hole. Accordingly, in an emergency situation, it is possible to reliably achieve the state in which only the positional relation of the steering member with respect to the steered wheels deviates from the normal positional relation to reliably notify the driver of occurrence of an abnormality.

In the vehicle steering system according to the aspect described above, the emergency position keeping portions may be plastically deformable, and a width of each of the emergency position keeping portions may be smaller than an outer diameter of the bolt. In this case, in an emergency situation, the bolt is displaced while plastically deforming one of the emergency position keeping portions. As a result, impact energy is absorbed. In addition, the bolt that has been displaced is engaged with one of the emergency position keeping portions, which has been plastically deformed. As a result, it is possible to reliably keep the position of the bolt that has been displaced.

In the vehicle steering system according to the aspect described above, an edge portion of the center portion of the long hole may be in a curved recess shape such that the bolt is loosely fitted in the center portion. In this case, when the bolt is inserted through the long hole during assembly, it is possible to easily guide the bolt to the center portion of the long hole and insert the bolt through the long hole. Accordingly, it is possible to easily assemble the vehicle steering system. Further, the vehicle steering system according to the aspect described above may further include a positional relation detection unit that detects the positional relation of the steering member with respect to the steered wheels, and an alarm device that gives the driver an alarm about occurrence of deviation of the positional relation from the normal positional relation based on a value of the deviation of the positional relation, detected by the positional relation detection unit. In this case, it is possible to reliably notify the driver of occurrence of the deviation of the positional relation of the steering member with respect to the steered wheel from the normal positional relation.

BRIEF DESCRIPTION OF THE DRAWINGS

Features, advantages, and technical and industrial significance of example embodiments of the invention will be described below with reference to the accompanying drawings, in which like numerals denote like elements, and wherein:

FIG. 1 is a view schematically showing the structure of an electric power steering system that serves as a vehicle steering system according to an embodiment of the invention;

DETAILED DESCRIPTION OF EMBODIMENTS

Figure 2:
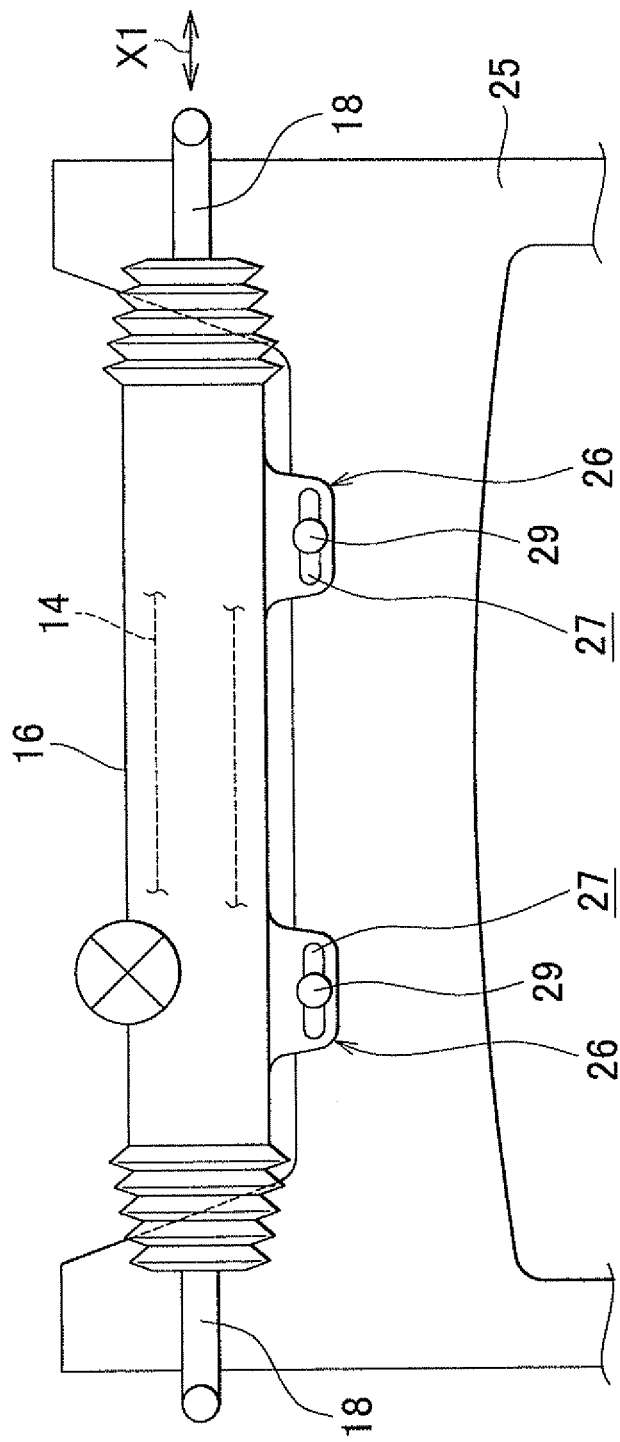
FIG. 2 is a view schematically showing the support structure for supporting a housing that supports a rack shaft.

Hereafter, embodiments of the invention will be described in detail with reference to the accompanying drawings. FIG. 1 is a view schematically showing the structure of an electric power steering system 1 that serves as a vehicle steering system according to an embodiment of the invention. As shown in FIG. 1, the electric power steering system 1 includes a steering wheel 2 that serves as a steering member, a steering mechanism 4, and a steering assist mechanism 5 that assists a driver in performing a steering operation. The steering mechanism 4 steers steered wheels 3 in response to the rotation of the steering wheel 2. The steering wheel 2 and the steering mechanism 4 are mechanically coupled to each other via a steering shaft 6 and an intermediate shaft 7.

In the following description of the embodiment, the steering assist mechanism 5 supplies a steering assist force to the steering shaft 6. However, the invention may be applied to the structure in which the steering assist mechanism 5 supplies a steering assist force to a pinion shaft described later, or the structure in which the steering assist mechanism 5 supplies a steering assist force to a rack shaft described later. Also, the invention may be applied to a manual steering system.

The steering shaft 6 includes an input shaft 8 coupled to the steering wheel 2, and an output shaft 9 coupled to the intermediate shaft 7. The input shaft 8 and the output shaft 9 are connected to each other via a torsion bar 10 so as to be rotatable relative to each other on the same axis. A torque sensor 11 is arranged around the steering shaft 6. The torque sensor 11 detects a steering torque input into the steering wheel 2, based on the amount of relative rotational displacement between the input shaft 8 and the output shaft 9. The torque detection result obtained by the torque sensor 11 is input into an ECU (Electronic Control Unit) 12 that is used as a motor control unit for steering assistance. Also, the vehicle speed detection result obtained by a vehicle speed sensor 90 is input into the ECU 12. The intermediate shaft 7 couples the steering shaft 6 to the steering mechanism 4.

The steering mechanism 4 is constructed of a rack-and-pinion mechanism that includes a pinion shaft 13 and a rack shaft 14 that serves as a steered shaft. The pinion shaft 13 is coupled to the intermediate shaft 7. The pinion shaft 13 rotates in response to the steering of the steering wheel 2. A pinion 15 is provided at an end (lower end in FIG. 1) of the pinion shaft 13. The rack shaft 14 is housed in and supported by a cylindrical rack housing 16, which is fixed to a vehicle body, via rack bushes 17 that are slide bearings. The rack shaft 14 is supported so as to be able to reciprocate along an axial direction that is along a lateral direction X1 of the vehicle. Both end portions of the rack shaft 14 project outward from the corresponding ends of the rack housing 16. Tie-rods 18 are coupled to the respective end portions of the rack shaft 14. The tie-rods 18 are coupled to the corresponding steered wheels 3 via corresponding knuckle arms (not shown).

A rack 19 that meshes with the pinion 15 is formed in an axially intermediate portion of the rack shaft 14. The rotation of the pinion shaft 13 is converted into an axial motion of the rack shaft 14 by the pinion 15 and the rack 19. When the rack shaft 14 is moved in the axial direction, the steered wheels 3 are steered. When the steering wheel 2 is steered (rotated), the rotation is transmitted to the pinion shaft 13 via the steering shaft 6 and the intermediate shaft 7. The rotation of the pinion shaft 13 is converted into an axial motion of the rack shaft 14 by the pinion 15 and the rack 19. Thus, the steered wheels 3 are steered.

The steering assist mechanism 5 includes an electric motor 20 for steering assistance and a speed reduction mechanism 21. The speed reduction mechanism 21 is a transmission mechanism that transmits the torque output from the electric motor 20 to the steering mechanism 4. The speed reduction mechanism 21 includes a worm shaft 22 that serves as a drive gear, and a worm wheel 23 that serves as a driven gear that meshes with the worm shaft 22. The worm shaft 22 and the worm wheel 23 are housed in a gear housing 24.

FIG. 2 shows the structure for fitting the rack housing 16 that houses the rack shaft 14 used as a steered shaft, to a cross member 25 used as a vehicle body-side member. Paired right and left fitting brackets 26 are provided on the outer periphery of the rack housing 16 and extend toward, for example, the rear of the vehicle. Each fitting bracket 26 is made of a metal plate. Each fitting bracket 26 is fixed to the outer periphery of the rack housing 16, for example, by welding. A long hole 27, used as a first bolt insertion hole that extends along the lateral direction X1 of the vehicle, is formed in each fitting bracket 26.

Figure 3A:
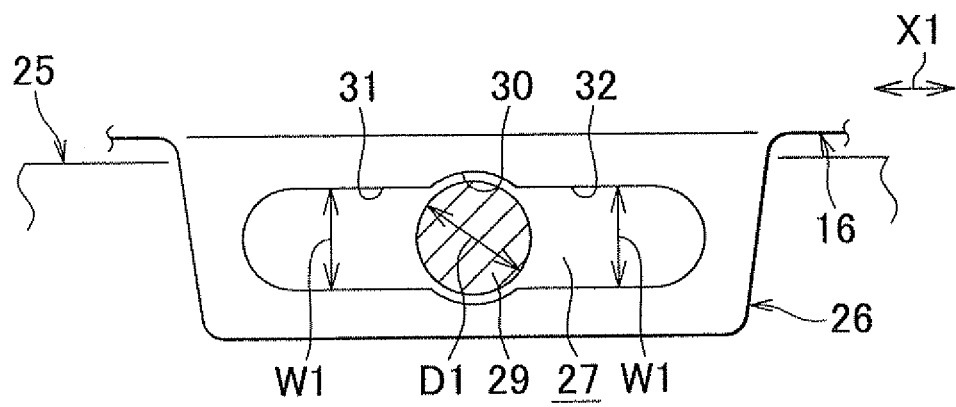
FIG. 3A is a partially cutaway plain view showing the support structure in a normal situation.
Figure 4:
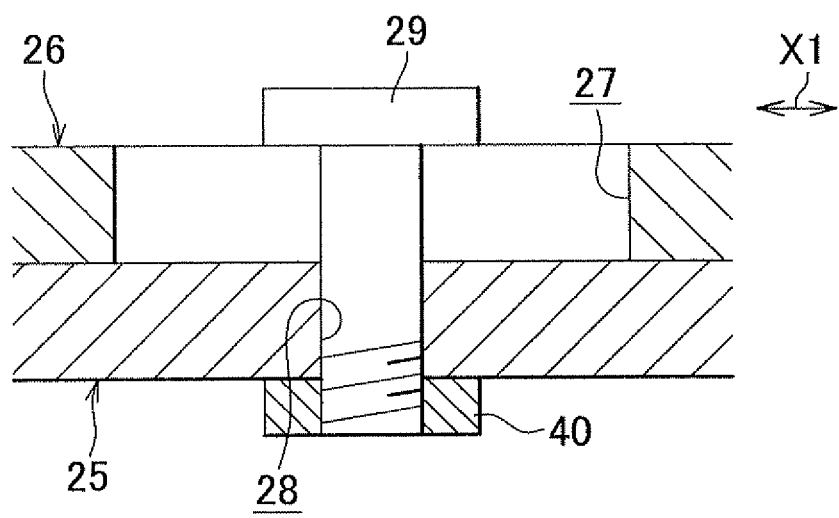
FIG. 4 is a sectional view showing a main portion of the support structure.

As shown in FIG. 4, a bolt 29 is inserted through the long hole 27 of each fitting bracket 26 and a second bolt insertion hole 28 that is a circular hole formed in the cross member 25. The bolt 29 that is inserted through these holes 27 and 28 is engaged with a nut 40. Each fitting bracket 26 is fastened to the cross member 25 with the bolt 29 and the nut 40. As shown in FIG. 3A, each long hole 27 is a hole that extends in the lateral direction X1 of the vehicle. Each long hole 27 has a center portion 30 and a pair of emergency position keeping portions 31 and 32. The center portion 30 is a portion in which the bolt 29 is fitted in a normal situation. The emergency position keeping portions 31 and 32 are formed on respective sides of the center portion 30. Each of the emergency position keeping portions 31 and 32 is a plastically deformable portion for keeping the position of the bolt 29 that has been displaced with respect to the center portion 30 in an emergency situation.

A width W1 of each of the emergency position keeping portions 31 and 32 of the long hole 27 is set smaller than an outer diameter D1 of the bolt 29 (W1<D1). Therefore, in a normal situation, the bolt 29 is not allowed to move out of the center portion 30. In an emergency situation where the steered wheel 3 drives over, for example, a curb and a reverse input that is equal to or larger than a predetermined value is applied to the steered wheel 3, as shown in, for example, FIG. 3B, when the bolt 29 moves relative to the center portion 30, the width of one of the emergency position keeping portions 31 and 32 (the emergency position keeping portion 31 in an example in FIG. 3B) is increased by plastic deformation.

Figure 3B:
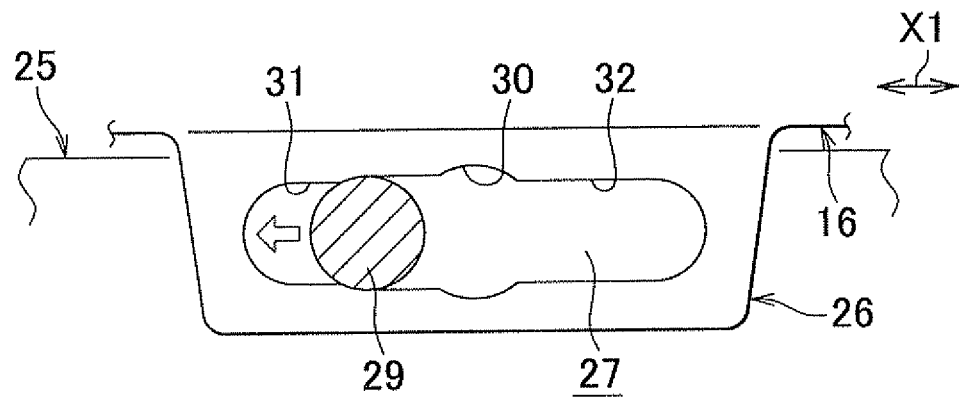
FIG. 3B is a partially cutaway plain view showing the support structure in an emergency situation where a steered wheel drives over, for example, a curb and an abrupt reverse input is applied to the steered wheel.

Each edge portion of the center portion 30 of the long hole 27 is in a curved recess shape such that the bolt 29 is loosely fitted in the center portion 30. More specifically, the edge portion of the center portion 30 forms a part of a circle (i.e., arch-shape) that has a curvature slightly larger than the curvature of the periphery of the bolt 29. According to the embodiment, when the steered wheel 3 strongly collides with, for example, a curb and a relatively large reverse input is applied to the rack housing 16 via the rack shaft 14, as shown in FIG. 3B, the bolt 29 fixed to the cross member 25 of the vehicle moves, along the lateral direction X1 of the vehicle, within the long hole 27 of the fitting bracket 26 fixed to the rack housing 16. Thus, it is possible to displace the fitting brackets 26 and the rack housing 16 with respect to the cross member 25 in the lateral direction X1 of the vehicle.

Therefore, it is possible to achieve the state where only the positional relation of the steering wheel 2 with respect to the steered wheels 3 deviates from the normal positional relation without causing misalignment of the steered wheels 3. As a result, it is possible to notify the driver of occurrence of an abnormality. The driver who has recognized the occurrence of the abnormality is urged to drive the vehicle to, for example, an auto-repair garage. Also, in a steering path extending from the steering wheel 2 to the steered wheels 3, the fitting brackets 26 of the rack housing 16, which are relatively close to the steered wheels 3, are displaced with respect to the cross member 25 so that an impact is absorbed. Thus, most of the components arranged at the upstream side portion of the steering path are not affected. Especially, in the column-type electric power steering system 1 as described in the embodiment, components having high rotary inertia such as the steering wheel 2, the electric motor 20 and the speed reduction mechanism 21 are arranged near the steering shaft 6. However, an impact force is not applied to these components. Therefore, it is possible to protect a main portion of the electric power steering system 1 against the above-described relatively large reverse input. As a result, it is possible to maintain the basic steering performance of the electric power steering system 1 except that the position of the steering wheel 2 is displaced when the vehicle travels straight.

In addition, in the long hole 27, paired position keeping portions 31 and 32 are formed on respective sides of the center portion 30 in which the bolt 29 is fitted in a normal situation. Therefore, the position of the bolt 29 displaced with respect to the center portion 30 in an emergency situation is kept by one of the emergency position keeping portions 31 and 32. Accordingly, in an emergency situation, it is possible to reliably achieve the state in which only the positional relation of the steering wheel 2 with respect to the steered wheels 3 deviates from the normal positional relation to reliably notify the driver of occurrence of an abnormality.

In addition, the width W1 of each of the emergency position keeping portions 31 and 32 is set smaller than the outer diameter D1 of the bolt 29. Accordingly, in an emergency situation, the bolt 29 is displaced while plastically deforming one of the emergency position keeping portions 31 and 32. As a result, impact energy is absorbed. In addition, the bolt 29 that has been displaced is engaged with one of the emergency position keeping portions 31 and 32, which has been plastically deformed. As a result, it is possible to reliably keep the position of the bolt 29 that has been displaced.

Figure 5:
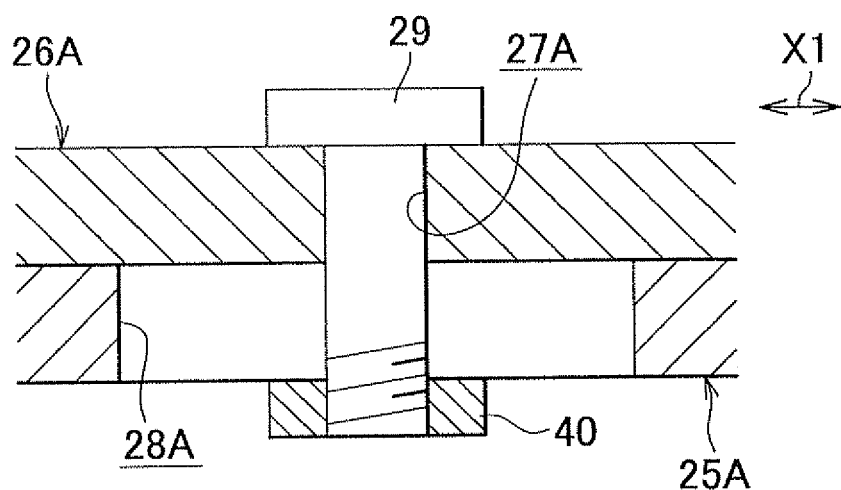
FIG. 5 is a sectional view showing a main portion of the support structure for supporting a housing that supports a rack shaft according to a first alternative embodiment of the invention.

Also, the edge portion of the center portion 30 of the long hole 27 is in a curved recess shape such that the bolt 29 is loosely fitted in the center portion 30. Therefore, when the bolt 29 is inserted through the long hole 27 during assembly, it is possible to easily guide the bolt 29 to the center portion 30 of the long hole 27 and insert the bolt 29 through the long hole 27. Accordingly, it is possible to easily assemble the electric power steering system 1. In the embodiment described above, as shown in FIG. 4, the first bolt insertion hole of the fitting bracket 26 is the long hole 27, and the second bolt insertion hole 28 of the cross member 25 is the circular hole. Alternatively, as in a first alternative embodiment of the invention shown in FIG. 5, a first bolt insertion hole 27A of a fitting bracket 26A may be a circular hole, and a second bolt insertion hole 28A of a cross member 25A may be a long hole that extends in the lateral direction X1 of the vehicle.

Figure 6:
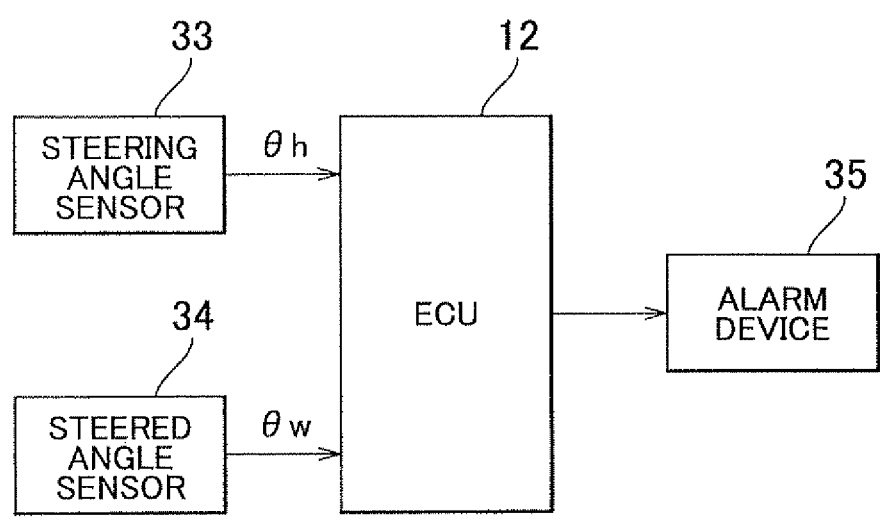
FIG. 6 is a block diagram showing the electrical configuration of a vehicle steering system according to a second alternative embodiment of the invention.

The invention is not limited to the embodiments described above. For example, the configuration according to a second alternative embodiment of the invention shown in FIG. 6 may be employed. According to this configuration, occurrence of deviation of the positional relation of the steering wheel 2 with respect to the steered wheels 3 in an emergency situation from the normal positional relation may be detected by a positional relation detection unit, and the electric power steering system 1 may actively issue an alarm to the driver to notify the driver of the occurrence of abnormality. That is, a steering angle sensor 33 that detects a steering angle θh of the steering wheel 2 and a steered angle sensor 34 that detects a steered angle θw of the steered wheels 3 are provided in the electric power steering system 1. Signals from (values detected by) the steering angle sensor 33 and the steered angle sensor 34 are input in the ECU 12. An alarm device, for example, an alarm lamp or an alarm buzzer is connected to the ECU 12.

The ECU 12 detects deviation of the positional relation of the steering wheel 2 with respect to the steered wheels 3 from the normal positional relation based on the comparison between the steering angle θh detected by the steering angle sensor 33 with the steered angle θw detected by the steered angle sensor 34. The ECU 12 causes the alarm device 35 to issue an alarm upon detection of the deviation, In addition, various modifications may be made within the scope of claims.

What is claimed is:
1. A vehicle steering system, comprising:
a steering member;
steered wheels;
a steered shaft that moves in an axial direction that extends along a lateral direction of a vehicle in response to an operation of the steering member to thereby steer the steered wheels;
a housing that supports the steered shaft such that the steered shaft is movable in the axial direction;
a fitting bracket that is formed on the housing and that has a first bolt insertion hole;
a vehicle body-side member that has a second bolt insertion hole; and a bolt that is inserted through the first bolt insertion hole and the second bolt insertion hole to fasten the fitting bracket to the vehicle body-side member, wherein;

one of the first bolt insertion hole and the second bolt insertion hole is a long hole that extends in the lateral direction;

in an emergency situation where a reverse input equal to or larger than a predetermined value is applied from a road surface to the steered wheels, the bolt is displaced within the long hole in the lateral direction, causing the fitting bracket to displace with respect to the vehicle body-side member in the lateral direction;

the long hole has a center portion in which the bolt is fitted in a normal situation, and paired emergency position keeping portions that are formed on respective sides of the center portion and used to keep a position of the bolt that has been displaced in the emergency situation;

the emergency position keeping portions are plastically deformable;

a width of each of the emergency position keeping portions is smaller than an outer diameter of the bolt; and an edge portion of the center portion of the long hole is in a curved recess shape such that the bolt is loosely fitted in the center portion.

2. The vehicle steering system according to claim 1, further comprising:

a positional relation detection unit that detects a positional relation of the steering member with respect to the steered wheels; and an alarm device that gives a driver an alarm about occurrence of deviation of the positional relation from a normal positional relation based on a value of the deviation of the positional relation, detected by the positional relation detection unit.

* * * * *